(12) United States Patent
Essafi

(10) Patent No.: US 8,881,450 B2
(45) Date of Patent: Nov. 11, 2014

(54) METHODS AND APPARATUSES FOR STABILIZING TREES AGAINST TOPPLING FORCES

(71) Applicant: Wahid Essafi, Closter, NJ (US)

(72) Inventor: Wahid Essafi, Closter, NJ (US)

(*) Notice: Subject to any disclaimer, the term of this patent is extended or adjusted under 35 U.S.C. 154(b) by 0 days.

(21) Appl. No.: 14/026,606

(22) Filed: Sep. 13, 2013

(65) Prior Publication Data

US 2014/0202074 A1 Jul. 24, 2014

Related U.S. Application Data

(60) Provisional application No. 61/871,131, filed on Aug. 28, 2013, provisional application No. 61/754,178, filed on Jan. 18, 2013.

(51) Int. Cl.
*A01G 13/00* (2006.01)
*A01G 17/04* (2006.01)

(52) U.S. Cl.
CPC ............ *A01G 17/04* (2013.01); *A01G 13/0237* (2013.01)
USPC ............................................. 47/32.4; 47/32.6

(58) Field of Classification Search
CPC .................................................. A01G 13/0237
USPC ........ 47/1.01 R, 32.7, 32.8, 42, 43, 32.4–32.6
See application file for complete search history.

(56) References Cited

U.S. PATENT DOCUMENTS

| | | | |
|---|---|---|---|
| 3,206,892 A * | 9/1965 | Telkes et al. | 47/19.1 |
| 3,270,461 A * | 9/1966 | Fowler | 47/2 |
| 4,073,090 A | 2/1978 | Lucia | |
| 4,495,723 A * | 1/1985 | Wasserman | 47/2 |
| 4,922,652 A | 5/1990 | Graves | |
| 5,030,031 A * | 7/1991 | Brown | 405/36 |
| 5,148,628 A * | 9/1992 | Wulkowicz | 47/48.5 |
| 5,375,368 A | 12/1994 | Motz | |
| 5,509,229 A * | 4/1996 | Thomasson et al. | 47/29.2 |
| 5,579,794 A | 12/1996 | Sporta | |
| 5,581,935 A | 12/1996 | Anderson | |
| 5,613,320 A * | 3/1997 | Thomasson et al. | 47/32.1 |
| 5,743,508 A | 4/1998 | Fiveash | |
| D403,929 S | 1/1999 | Evans | |
| 6,032,408 A | 3/2000 | Nielsen | |
| 6,128,851 A | 10/2000 | Radston | |
| 6,226,933 B1 | 5/2001 | Nelson | |
| 6,282,835 B1 * | 9/2001 | Richtsmeier | 47/24.1 |
| 8,296,995 B1 | 10/2012 | Georges | |

(Continued)

FOREIGN PATENT DOCUMENTS

WO    WO 02/45481 A2    6/2002

OTHER PUBLICATIONS

Brookes, Preventing death and serious injury from falling trees and branches, Australian Journal of Outdoor Education, 11(2), 50-59, 2007.

(Continued)

*Primary Examiner* — David Parsley
*Assistant Examiner* — Danielle Clerkley
(74) *Attorney, Agent, or Firm* — Paul Diamond, Esq.; Diamond Law Office LLC

(57) ABSTRACT

The invention provides methods for inhibiting the uprooting and toppling of trees during storms, and tree-stabilizing apparatuses adapted for this purpose.

29 Claims, 6 Drawing Sheets

(56) References Cited

U.S. PATENT DOCUMENTS

| | | | |
|---|---|---|---|
| 8,316,579 B1 | 11/2012 | Brown | |
| 8,336,252 B1 | 12/2012 | Ammons | |
| 8,407,934 B1 | 4/2013 | Solares | |
| 2002/0116849 A1 | 8/2002 | Carolan | |
| 2002/0148158 A1 | 10/2002 | Anderson | |
| 2003/0118407 A1* | 6/2003 | Gertz et al. | 405/115 |
| 2003/0182853 A1 | 10/2003 | Mancini | |
| 2003/0221364 A1 | 12/2003 | Mello | |
| 2004/0144022 A1* | 7/2004 | Roebuck | 47/29.1 |
| 2004/0200143 A1 | 10/2004 | Stanley | |
| 2007/0209291 A1 | 9/2007 | Perez | |
| 2008/0072487 A1 | 3/2008 | Lammers | |
| 2008/0134573 A1 | 6/2008 | Flaster | |
| 2010/0180537 A1 | 7/2010 | Flaster | |
| 2012/0240459 A1 | 9/2012 | Curtis et al. | |

OTHER PUBLICATIONS

Knudson, Why Do Trees Topple in a Storm?, Guest Blog, Scientific American Blog, Nov. 12, 2012, downloaded Aug. 1, 2013 from permanent link http://blogs.scientificamerican.com/guest-blog/2012/11/12/why-do-trees-topple-in-a-storm/.

Duryea & Kampf, Chapter 5, Wind and Trees: Lessons Learned From Hurricanes, Publication No. FOR 118 of the Urban Forest Hurricane Recovery series of the School of Forest Resources and Conservation and the Environmental Horticulture Department, Florida Cooperative Extension Service, Institute of Food and Agricultural Sciences, University of Florida. Original publication date Jan. 2007. Reviewed Feb. 2011.

* cited by examiner

METHODS AND APPARATUSES FOR STABILIZING TREES AGAINST TOPPLING FORCES

CROSS-REFERENCE TO RELATED APPLICATIONS

This application claims the benefit of U.S. provisional application Ser. Nos. 61/871,131 filed Aug. 28, 2013 and 61/754,178 filed Jan. 18, 2013, each of which is hereby incorporated by reference in its entirety.

FIELD OF THE INVENTION

The invention relates to the field of protecting structures from damage caused by falling trees.

BACKGROUND OF THE INVENTION

Strong winds can create enough strain on trees to uproot and topple them. As demonstrated by the aftermath of hurricane Sandy, such events not only present considerable risk to human life, but can also cause severe damage to houses and structures of all kinds, as well as to vehicles, and to power lines and their supporting structures. Fallen trees can also block roadways disrupting ground transportation by emergency and civilian vehicles. In addition, even when tree falls do not cause structural or property damage or roadway closure, they nevertheless implicate economic losses for property owners (or their insurers) due to the typically required removal of the fully or partially toppled trees from the affected properties and the attendant restoration of the disrupted landscape. As some trees are also assigned substantial value, significant economic loss may also be experienced as a result of losing the tree itself, when it is not possible or economical to stably replant the tree. Still further, the loss of an established tree negatively impacts the environment since it can no longer sequester carbon dioxide in the process of growth.

In view of the foregoing, what is needed and provided by the present invention is a manner of inhibiting the toppling of trees, especially those precariously located near living quarters or susceptible infrastructure.

SUMMARY OF THE INVENTION

One embodiment of the invention provides a method for inhibiting the toppling of a tree rooted in the ground that includes the steps of:

disposing one or more objects having weight on the ground at least partially above the roots of the tree, for example, within a radius of 7, 6, 5, 4, 3, 2 or 1 feet from the trunk of the tree, wherein the one or more objects at least substantially surround the trunk of the tree, and wherein the objects collectively weigh, for example, at least five hundred pounds, at least one thousand pounds, at least one ton (2,000 pounds), at least 2 tons, or at least 3 tons.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

DETAILED DESCRIPTION

Figure 1:
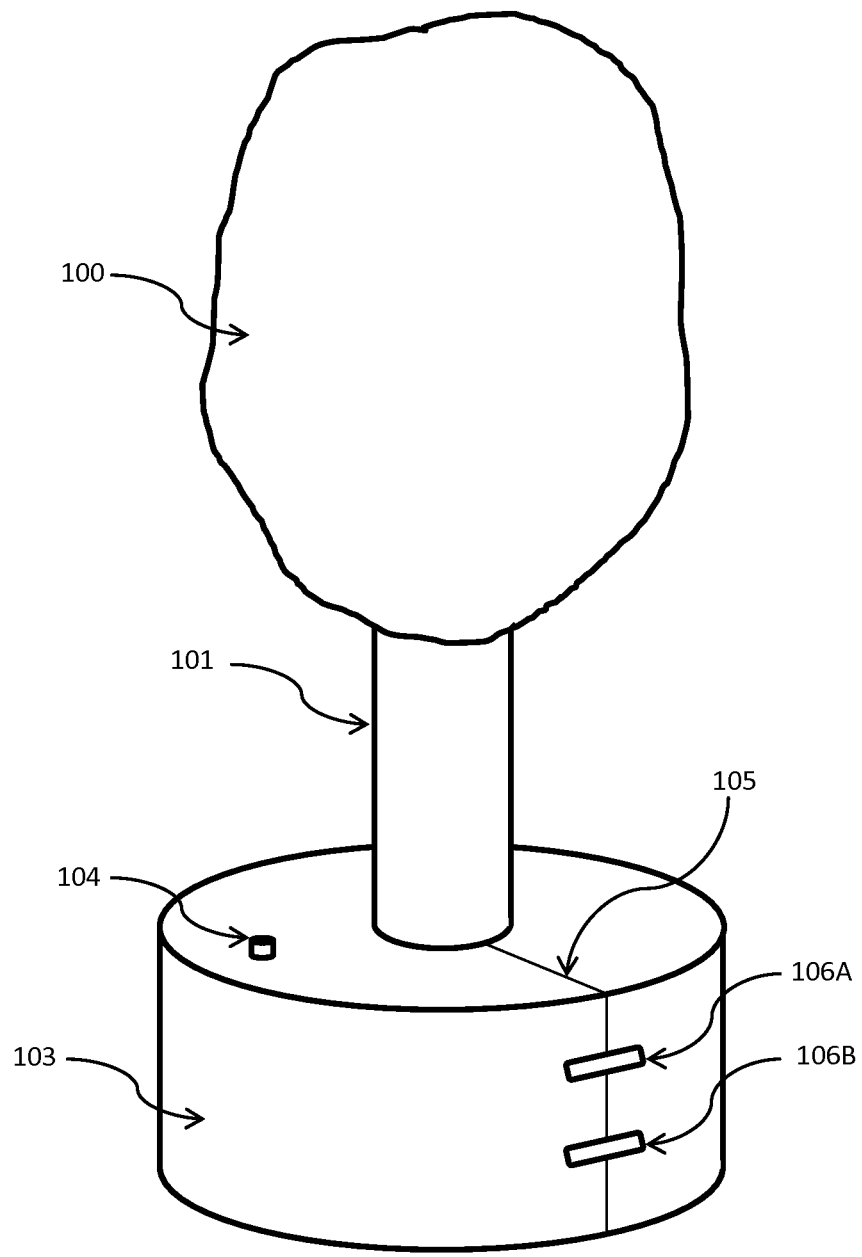
FIG. 1 shows a cylinder-shaped, tree-stabilizing bladder embodiment of the invention installed around the trunk of a tree.

The invention provides apparatuses and related methods for inhibiting the uprooting and toppling of trees during strong winds. A characteristic feature of the invention is the disposition of substantial weight on the ground surrounding the trunk. The added weight placed at the base of the tree stabilizes the tree by putting pressure on the soil covering the roots and lowering the center of gravity of the combination.

Any given tree can resist winds up to a certain velocity coming from one direction. If the wind velocity exceeds this critical value, as it happens in a storm, the tree gets uprooted and falls due to the leverage of the wind force on its leaves, branches, trunk and root system. This critical wind velocity varies based on multiple factors, mainly:—the type of tree, —its size, —its height, —its surface facing the wind, —its shape, —the size and the shape of its roots, and- the type and the shape of the soil it is rooted in. All of these factors contribute to the ability of a tree to resist the power of a storm.

This invention can considerably increase the amount of energy needed to uproot any given tree. By placing one or more objects of substantial weight on the ground at the base of a tree, such as surrounding the tree, the critical velocity can be increased beyond the maximum wind velocity that can be expected during a storm. The shape and the size will be essentially determined by the type and the size of the tree for a given wind velocity. The object(s) may be placed, for example, within a radius of the trunk of the tree, such as within a 10, 9, 8, 7, 6, 5, 4, 3 or 2-foot radius of the trunk. The object or objects placed about a tree according to the invention may take any form.

One embodiment of the invention provides a flexible, collapsible, liquid-fillable (such as water-fillable) bladder that is configured to be placed on the ground surrounding a tree trunk and filled with liquid through a port or valve. Such a bladder may be sized and configured such to contain hundreds, thousands and even tens of thousands of pounds of water when filled.

The apparatus of the embodiment may be made of strong, waterproof material such as a durable flexible synthetic polymer or reinforced polymer fabric, such as but not limited to a polyurethane or vinyl polymer fabric, which may have a filled shape of a cylinder, a sphere, a cone or any other shape or design to adapt to the environment of the tree it is intended to protect. Fittings such as ports and closures for filling and emptying the bladders may, for example, be made from a synthetic polymer such as polypropylene and/or a metal such as stainless steel or aluminum.

In one variation, a single bladder apparatus is sized and configured to surround a tree trunk. In this case, the circumferential continuity of the ring of the bladder must be interrupted in order to be placed around the tree trunk. Such a variation may have a "letter-C" configuration. The apparatus may be secured around the tree, e.g., by straps and buckles spanning the radial discontinuity in the circumference of the bladder, so that the opening of the C-configuration is at least partially closed and/or so that the tree trunk cannot laterally exit the radial discontinuity in the bladder.

Liquid fillable embodiments of the invention may also be configured to surround a tree trunk totally or partially based on the space available around the tree.

Once the apparatus is installed around the trunk of a tree, it may be filled with water, for example, via a port or valve disposed in the top portion of the bladder apparatus. A strap (such as with a buckle mechanism) or other closing mechanism will be used to consolidate the bladder with the trunk. Water is environmentally friendly and can be naturally recycled into the water table after use. Its density, availability and cost-effectiveness make it the most efficient product to be considered for filling bladder-type apparatuses of the invention. 1 $m^3$ of water weighs approximately 1 ton (2,000 pounds). In addition, the use of potable water to fill the bladder, such as commonly available from a residential or commercial garden faucet permits the bladder apparatus to act as a potable water reservoir from which potable water can be drawn following a storm in the event that the local potable water supply is interrupted or contaminated.

The set-up and removal of a single bladder, tree stabilizer embodiment of the invention is simple enough to be performed by the average homeowner. The bladder apparatus may be provided with at least one hose connector or closable, such as reversibly closable, port used to fill it up with water during the installation process and empty it for removal after usage. The port of the bladder may, for example, be a tubular member with external threading so that it may be closed by a screw-on cap with corresponding internal threading. The set-up and removal of a fillable bladder apparatus according the invention is made easy since the weight of the empty bladder apparatus may be minimal compared to its filled weight. For example, a bladder capable of holding several tons of water may itself weigh only 20-100 pounds.

Three simple steps are needed to set up a bladder-type the apparatus of the invention:
  placing the unfilled apparatus down around the tree;
  hooking up a fill hose and filling up the apparatus with water; and
    locking/securing the apparatus about the tree
  Three simple steps are needed to remove the apparatus from a tree:
    unlocking it from the tree;
    emptying the apparatus (by letting the water run out or pumping it out); and
    removing the apparatus from about the tree.

Neither the installation process nor the removal process take much time or require any special skills or special tools.

In addition to the weight of apparatuses according to the invention inhibiting the uprooting of trees during storms, a further mechanism provided by some embodiments of the invention, such as the bladder-type apparatus embodiments of the invention, is stabilizing trees from uprooting and toppling by blocking water penetration to the ground (soil) surrounding the trunk of the tree in which the roots of the tree are disposed.

Collapsible bladder embodiments of the invention may include or not include internal baffles or internal reinforcing panels of material.

Various aspects of the invention are further described with respect to the appended figures, as follows:

FIG. 1 shows a perspective view of a single filled bladder apparatus embodiment of the invention 103 installed around trunk 101 of tree 100. Bladder apparatus 103 has a circular, donut-like profile interrupted by radial break 105. A closable port 104 for filling and emptying the bladder is disposed on the top of bladder apparatus 103. Lateral straps 106A and 106B span radial break 105 to securably close apparatus 103 around trunk 101.

Figure 2:
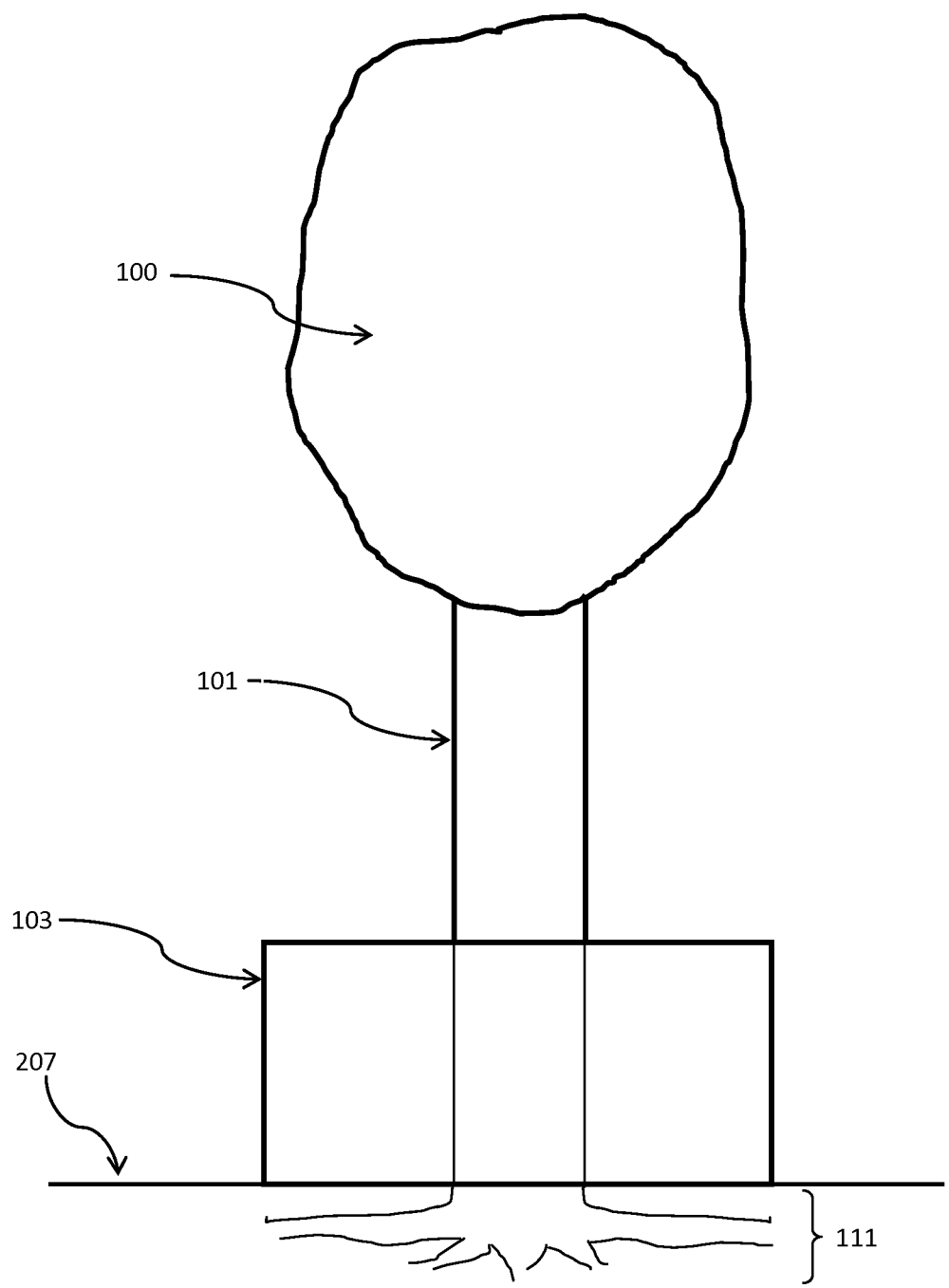
FIG. 2 shows a side view of the embodiment of FIG. 1.

FIG. 2 is a side view diagram of the assemblage of the tree and bladder apparatus shown in FIG. 1 showing the roots 111 of the tree disposed below ground level 207 under filled bladder apparatus 103.

Figure 3:
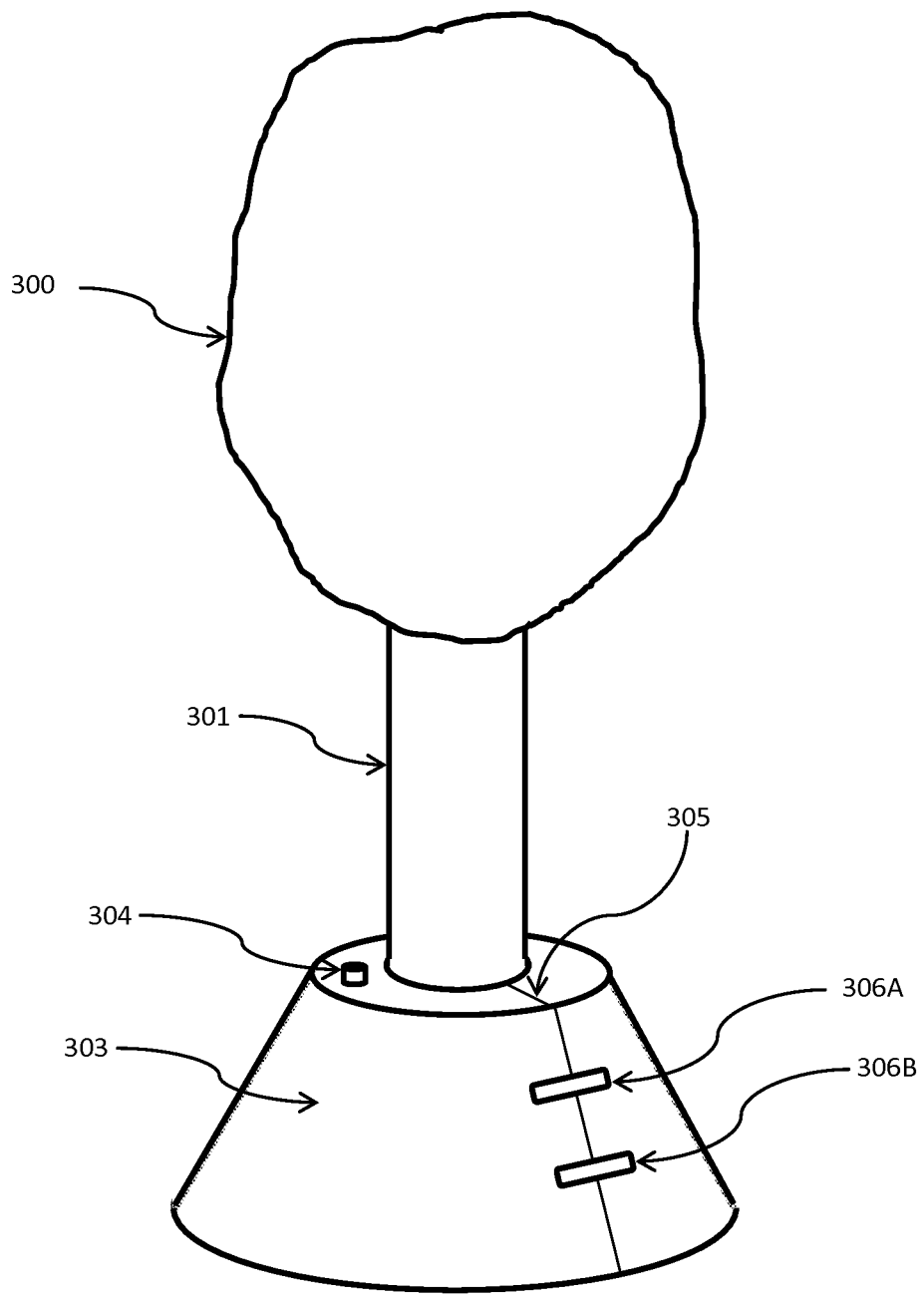
FIG. 3 shows a frusto-conical, tree-stabilizing bladder embodiment of the invention installed around the trunk of a tree.

FIG. 3 shows another single bladder apparatus embodiment of the invention 303, having a frusto-conical shape, installed about trunk 301 of tree 300. The circumferential continuity of bladder apparatus 303 is interrupted by radial break 305. A closable port 304 for filling and emptying the bladder is disposed on the top of bladder apparatus 303. Lateral straps 306A and 306B span radial break 305 to securably close apparatus 303 around trunk 301.

Figure 4:
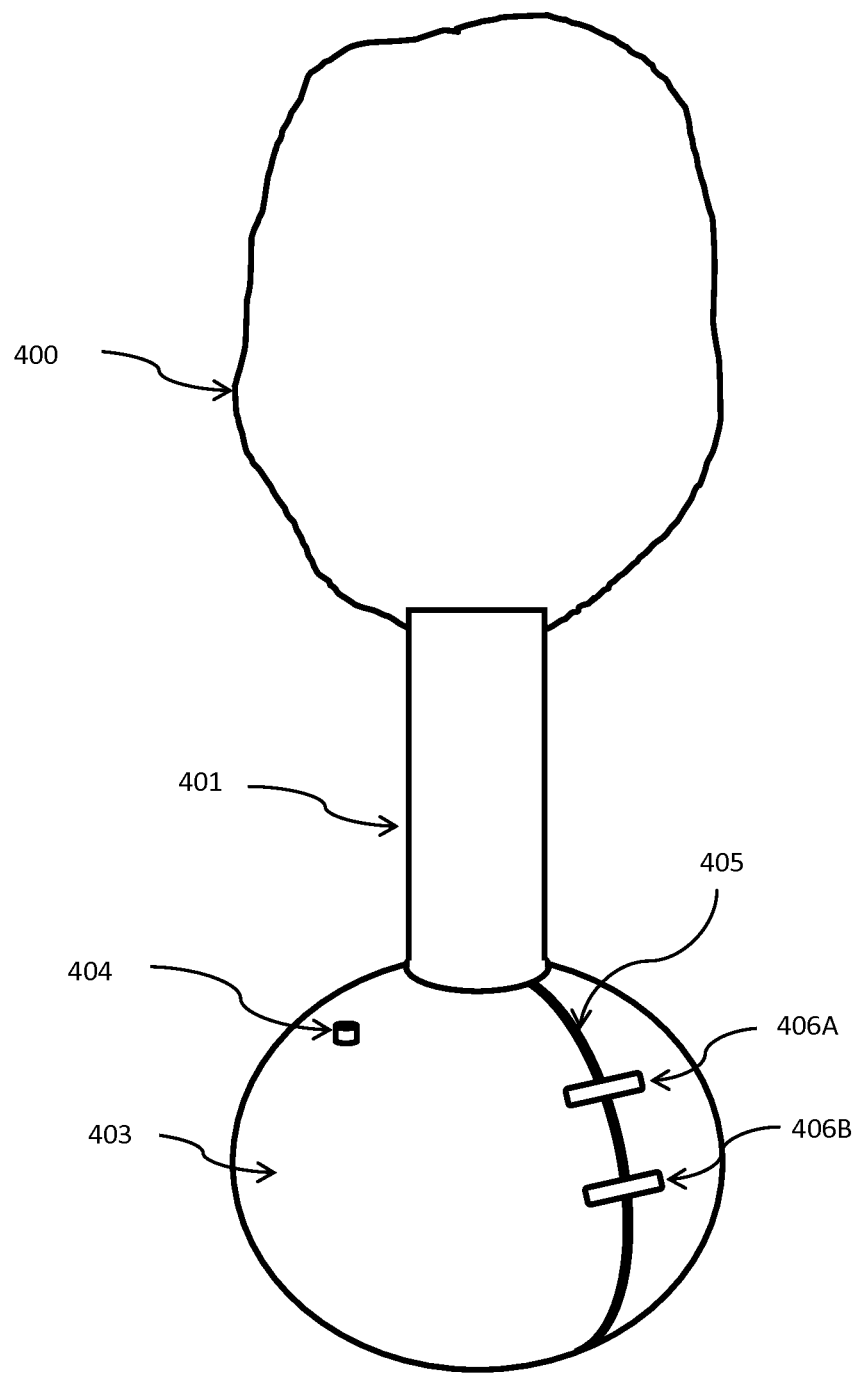
FIG. 4 shows a spherical, tree-stabilizing bladder embodiment of the invention installed around the trunk of a tree.

FIG. 4 shows another single bladder apparatus embodiment of the invention 403, having a spherical shape, installed about trunk 401 of tree 400. The circular continuity of bladder apparatus 403 is interrupted by radial break 405. A closable port 404 for filling and emptying the bladder is disposed in the top portion of bladder apparatus 403. Lateral straps 406A and 406B span radial break 405 to securably close apparatus 403 around trunk 401.

Figure 5:
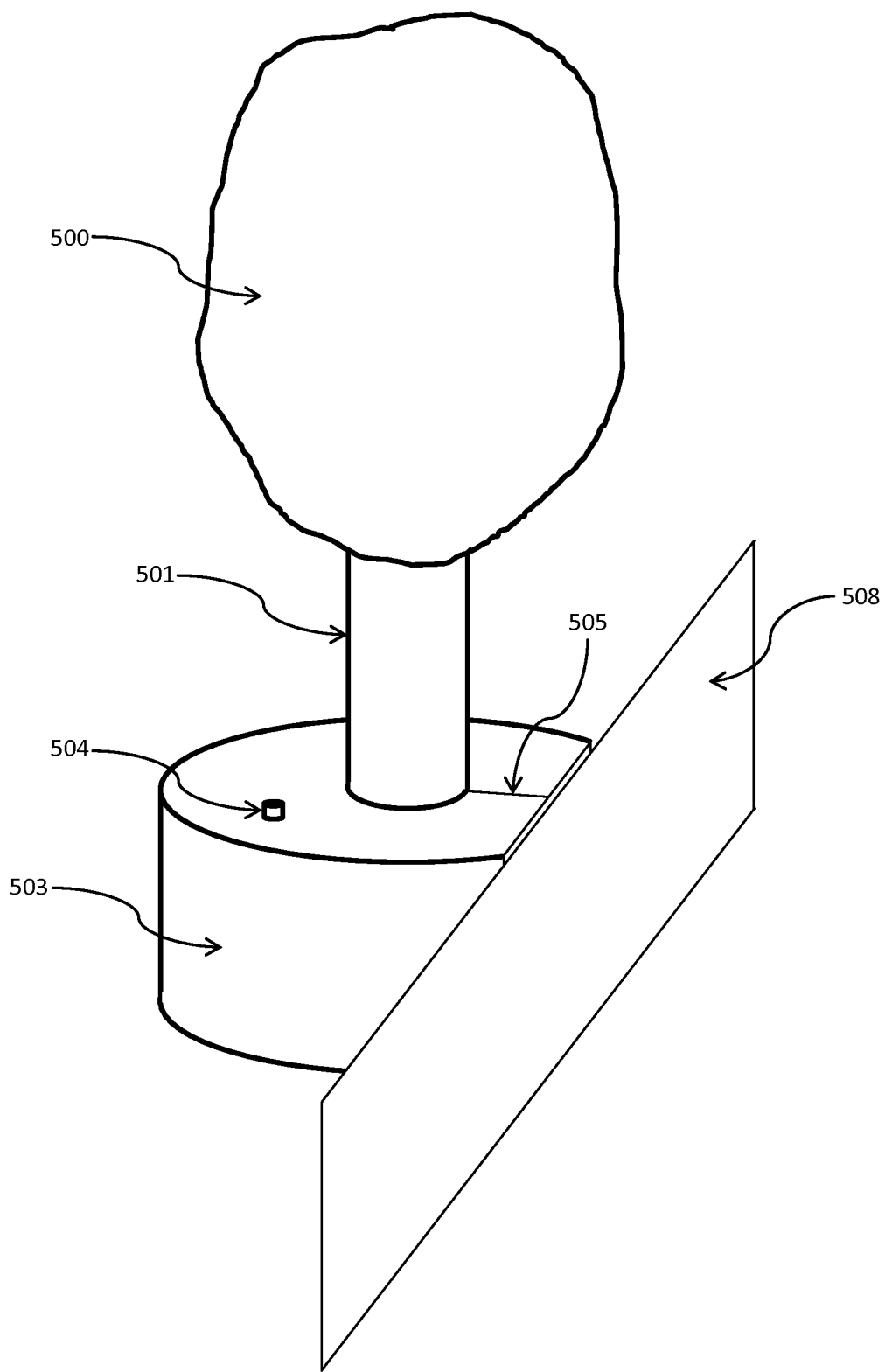
FIG. 5 shows a tree-stabilizing bladder embodiment of the invention having a shape adapted to accommodate environmental objects.

FIG. 5 shows another single bladder apparatus embodiment of the invention 503, having a shape configured to accommodate a nearby obstacle, fence 508, installed about trunk 501 of tree 500. As shown, the profile of bladder apparatus 503 is truncated versus bladder apparatus 103 of FIG. 1, so that apparatus 503 can be installed about tree 501 without removing fence 508. The circumferential continuity of bladder apparatus 503 is interrupted by radial break 505. A closable port 504 for filling and emptying the bladder is disposed in the top portion of bladder apparatus 503. Lateral straps (not visible, obstructed by fence 508) span radial break 505 to securably close apparatus 503 around trunk 501.

Figure 6:
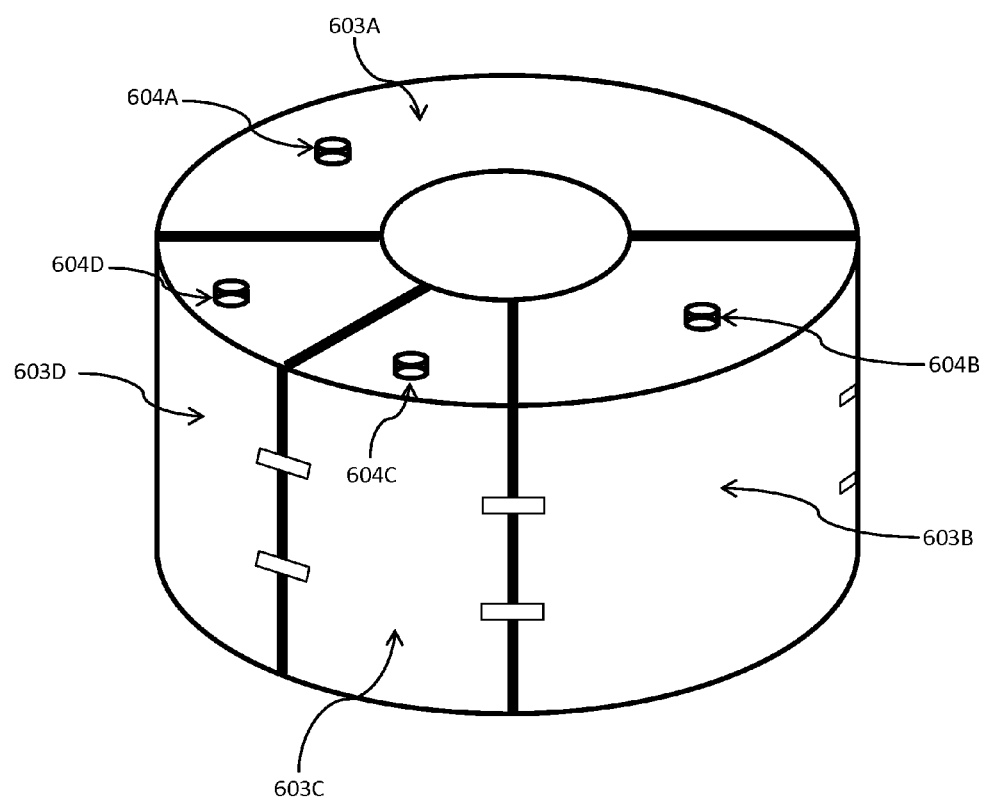
FIG. 6 shows a multi-segment, tree-stabilizing bladder embodiment of the invention.

FIG. 6 shows an embodiment of the invention that includes multiple circumferentially adjacent fillable bladder segments, 603A-603D, each with a closable port 604A-604D respectively for filling and emptying the segment. Circumferentially adjacent segments are secured to one another via straps or other joining members to secure the embodiment about the trunk of a tree. Those skilled in the art will appreciate that many different configurations of different sized segments are possible and may be employed for a particular application.

The apparatuses, assemblages and methods of the invention may be applied to trees located in an area that is in the path of a storm, such as a hurricane or cyclone. Thus, the apparatuses, assemblages and methods of the invention may be employed with trees during a storm. Preferably, the apparatuses are disposed about a tree in advance of an impending storm, remain in place during the storm, and are removed after the storm has passed or dissipated.

The liquid-fillable bladder apparatuses of the invention are not intended to automatically water the trees about which they are installed, at least not during the time they are installed to inhibit the uprooting of trees during a storm. Indeed, providing additional water to the soil in which a tree is rooted before or during a storm is disruptive to the integrity of the soil and increases the likelihood that the tree will be uprooted by storm winds. Thus, in any of the methods of the invention involving a liquid or water filled bladder apparatus or liquid or water filled container, the liquid fillable article used may be configured to not leak or drip water to the soil and, instead remain water-tight. Thus, such articles may lack drip valves.

Without limitation, the invention provides the following embodiments and variations thereof.

One embodiment of the invention provides a method for inhibiting the toppling of a tree rooted in the ground that includes the steps of:

disposing one or more objects having weight on the ground at least partially above the roots of the tree, for example, within a radius of 7, 6, 5, 4, 3, 2 or 1 feet from the trunk of the tree, wherein the one or more objects at least substantially surround the trunk of the tree, and wherein the objects collectively weigh, for example, at least five hundred pounds, at least one thousand pounds, at least one ton (2,000 pounds), at least 2 tons, or at least 3 tons.

The one or more objects may, for example, include:

a collapsible, flexible bladder having a voluminous body with a vertical dimension and a lateral dimension, a vertically oriented central aperture formed therein, and a radial break in the continuity of the bladder body between the aperture and the perimeter of the bladder body, said break bounded by opposing vertical walls of the bladder body, and said bladder including least one closable, such as reversibly closable, opening for filling the bladder with a medium; and a liquid medium such as water or friable medium such as sand disposed within the bladder, the medium weighing, for example, at least 300 pounds.

The disposing step may further include:

disposing the bladder on the ground about the tree so that the tree trunk extends vertically through the central aperture of the bladder; and filling the bladder with at least 300 pounds of a liquid medium such as water or a friable medium such as sand.

The bladder may, for example, be filled to at least 85%, at least 90% or at least 95% of its internal volume. The bladder may, for example, be at least substantially completely filled.

The method may further include: after the step of disposing the bladder on the ground about the tree so that the tree trunk extends vertically through the central aperture of the bladder, securing, such as reversibly securing, the opposing sides of the bladder that bound the radial break to each other, for example, using straps attached to the outward facing walls of the opposing sides. This securing step may be performed before or after or during filling the bladder with the medium. A bladder apparatus of the invention may have straps and/or connection points, such a metallic loops, integrally joined to the bladder and disposed on its exterior face to facilitate securing the apparatus about a tree trunk. The opposing sides of the bladder that bound the radial discontinuity may, for example, be secured to one another at the exterior facing side walls, at the top, at the bottom and/or at the interior wall bounding the central aperture. Bindings or securements at the bottom and at the wall bounding the aperture that may be used generally must be placed before the bladder is substantially filled since filling the bladder prevents access to these faces.

The one or more objects used in the method may include a plurality of solid objects, for example, cement or concrete blocks. In this case, the disposing step further include, securing laterally adjacent objects of the plurality of objects to each other, for example straps or chains attached to loops screwed into or molded into the solid objects. The solid objects may be mutually sized and configured to laterally interlock with each other, such as in a dovetail configuration, and securing laterally adjacent objects of the plurality of objects to each other comprises laterally interlocking said laterally adjacent objects.

The one or more objects used in the method may include a plurality of tubs filled with solid media. The tubs may be formed from metal, polymer, fiberglass or any suitably rigid material. The tubs may be filled with a liquid medium such as water or a solid medium such as sand, gravel, aggregate and/or stone. A tub may be open on its top and reversibly securably closable with a lid. Tubs that are laterally (circumferentially) adjacent when surrounding a tree trunk may be secured to each other, for example, with straps or chains. The tubs may be mutually sized and configured to laterally interlock with each other, and securing laterally adjacent tubs of the plurality of objects to each other may include laterally interlocking said laterally adjacent tubs.

One or more base plates and/or mats may optionally be disposed between the one or more objects and the ground. Thus, the one or more base plates and/or mats may be placed directly on the ground and then the one or more objects may be placed thereon.

In a typical application of the method, the subject tree is rooted at a location in the path of a storm, the disposing step is performed before the storm arrives at the location, and the one or more objects remain disposed on the ground about the tree during the storm. After the storm has passed or dissipated to an extent that uprooting or toppling during the storm is no longer a risk, the one or more objects may be removed from around the tree.

A related embodiment of the invention provides an uprooting-resistant tree assemblage that includes:

a tree rooted in the ground, the tree having a trunk; and one or more objects having weight disposed on the ground at least partially above the roots of the tree, for example, within a radius of 7, 6, 5, 4, 3, 2 or 1 feet from the trunk of the tree, wherein the one or more objects at least substantially surround the trunk of the tree, and wherein the objects collectively weigh, for example, at least five hundred pounds, at least one thousand pounds, at least one ton (2,000 pounds), at least 2 tons, or at least 3 tons.

The one or more objects in the assemblage may be the same as, configured the same as and/or secured the same as described for the one or more objects in the aforementioned method embodiment and its variations. When the one or more objects of the assemblage include a bladder, it may, for example, be filled to at least 85%, at least 90% or at least 95% of its internal volume. The bladder may, for example, be at least substantially completely filled.

A tree trunk-surrounding bladder apparatus for stabilizing a rooted tree that includes:

a collapsible fillable bladder having a voluminous body with a vertical dimension and a lateral dimension, a vertically oriented central aperture formed therein, and a radial break in the continuity of the bladder body between the aperture and the perimeter of the bladder body, said break bounded by opposing vertical walls of the bladder body, wherein the bladder includes at least one closable, such as reversibly closable, opening for filling the bladder with a liquid medium, and wherein the volume (internal) of the bladder is at least 5 cubic feet, at least 10 cubic feet, at least 15 cubic feet, at least 20 cubic feet or at least 25 cubic feet.

The bladder may be water-tight, i.e., it does not leak or seep water when filled. Thus, the bladder may be made from a polymeric fabric that is not porous to water. The bladder may lack drip valves. If the bladder has drip valves, they may be closable to prevent leakage of water through the valves.

The outer lateral dimension of the bladder may have any profile shape but preferably has an at least substantially oval profile such as an at least substantially circular profile. The top and bottom walls of the bladder may be at least substantially flat. Thus, the bladder may have a cylindrical outward-facing profile. The central aperture of the bladder may have any profile shape but preferably has an at least substantially oval profile such as an at least substantially circular profile. Hence, the aperture may also have a cylindrical profile.

The average lateral diameter of the aperture may, for example, be at least 6 inches, such as in the range of 0.5 to 6.0 feet. The average lateral diameter of the lateral outer dimension of the bladder may, for example, be in the range of 2.0 to 20.0 feet, such as in the range of 4.0 to 20.0 feet or 4.0 to 10.0 feet, greater than the average lateral diameter of the aperture. The vertical height of the bladder may, for example, be in the range of 1.0 to 7.0 feet, such as in the range of 1.0 to 6.0 feet or 1.0 to 5.0 feet.

It should be understood herein that placing any of the apparatuses or objects described herein on the ground about a tree means and may include directly placing said apparatuses or objects on the ground as well as placing them on top of at least one base or plate or membrane that in turn rests directly on the ground. As shown, for example, in FIGS. 1, 3 and 5, a fillable bladder apparatus embodiment of the invention may closely surround (even touching the trunk of a tree) and extend out in a radius away from the trunk. Desirably, this configuration places the weight of the bladder apparatus above a large part of the root mass of the tree. It also distributes the weight of the liquid contents of the bladder apparatus uniformly about apparatus itself and the tree. A mat, such as a Kevlar or fiberglass mat, may, for example, optionally be placed between the bladder apparatus and the ground. For embodiments where solid objects are used as the tree stabilizing weights, one or more base plates, such as metallic base plates, such as iron or steel base plates, (upon which the objects are placed) may be used to more broadly distribute the weight of the objects about the tree in the case that the objects themselves do not themselves have broad bases. In the case that the ground surrounding the trunk of a tree is irregular in surface, fill such as gravel may be placed to provide a more level surface upon which the base and/or objects can be placed.

Although the foregoing description is directed to the preferred embodiments of the invention. Other variations and modifications may be made without departing from the spirit or scope of the invention. Moreover, features described in connection with one embodiment of the invention may be used in conjunction with other embodiments, even if not explicitly stated above.

What is claimed is:

1. A method for inhibiting the toppling of a tree rooted in the ground, comprising the steps of:
    disposing one or more collapsible flexible water-tight bladders each having a voluminous body with an exterior surface and interior surface on the ground within a radius of seven feet from the trunk of the tree,
        wherein a first sealed terminal end of the one or more bladders directly abuts a second sealed terminal end of the one or more bladders to form a continuous circumferential boundary at least substantially and closely surrounding the trunk of the tree, and
    directly filling each of the bladders with a liquid or friable medium so that the medium filled into each bladder contacts the interior surface of the bladder and the one or more filled bladders collectively weigh at least five hundred pounds.

2. The method of claim 1, wherein the one or more bladders are collectively filled with at least 300 pounds of a liquid or friable medium.

3. The method of claim 1, wherein each bladder comprises at least one closable opening for filling the bladder with a medium.

4. The method of claim 3, wherein the opening is closed with a cap.

5. The method of claim 1, wherein
    the tree is rooted at a location in the path of a storm,
    the disposing step is performed before the storm arrives at the location, and
    the one or more bladders remain disposed on the ground about the tree during the storm.

6. The method of claim 1, wherein the disposing step comprises disposing a plurality of the bladders on the ground within a radius of seven feet from the trunk of the tree so that the plurality of bladders at least substantially surround the trunk of the tree in a circumferential relationship and circumferentially adjacent bladders are juxtaposed to and contacting each other.

7. The method of claim 6, further comprising the step of:
    securing circumferentially adjacent bladders to each other about the tree.

8. The method of claim 1, wherein the filling step comprises filling the one or more bladders with a liquid medium.

9. The method of claim 8, wherein the liquid medium consists essentially of water.

10. The method of claim 1, consisting essentially of the steps of:
    disposing one or more collapsible flexible water-tight bladders each having a voluminous body with an exterior surface and interior surface on the ground within a radius of seven feet from the trunk of the tree,
        wherein the one or more bladders at least substantially and closely surround the trunk of the tree, and
    directly filling each of the bladders with a liquid or friable medium so that the medium filled into each bladder contacts the interior surface of the bladder and the one or more filled bladders collectively weigh at least five hundred pounds.

11. The method of claim 10, wherein the liquid or friable medium consists essentially of water.

12. The method of claim 1, wherein the one or more bladders that at least substantially and closely surround the trunk of the tree are in contact with the trunk of the tree.

13. A method for inhibiting the toppling of a tree rooted in the ground, comprising the steps of:
    disposing on the ground at least substantially surrounding the trunk of the tree a single collapsible flexible water-tight bladder having a voluminous body with a vertical dimension and a lateral dimension, a vertically oriented central aperture formed therein, and a radial break in the continuity of the bladder body between the aperture and the perimeter of the bladder body, said break bounded by opposing vertical walls of the bladder body, and said bladder comprising least one closable opening in the top of the bladder for filling the bladder with a medium; and
    filling the bladder with a liquid or friable medium weighing at least 300 pounds, the filled bladder weighing at least 500 pounds.

14. A method for inhibiting the toppling of a tree rooted in the ground, comprising the steps of:

providing a collapsible flexible water-tight bladder having a voluminous body with a vertical dimension and a lateral dimension, a vertically oriented central aperture formed therein, and a radial break in the continuity of the bladder body between the aperture and the perimeter of the bladder body, said break bounded by opposing vertical walls of the bladder body, and said bladder comprising at least one closable opening for filling the bladder with a medium;

disposing the bladder on the ground about the tree so that the trunk of the tree extends vertically through the central aperture of the bladder with the bladder at least substantially surrounding the trunk; and filling the bladder with at least 300 pounds of a liquid or friable medium, the filled bladder weighing at least 500 pounds.

15. The method of claim 14, further comprising the step of:

after the step of disposing the bladder on the ground about the tree so that the tree trunk extends vertically through the central aperture of the bladder, securing the opposing sides of the bladder that bound the radial break to each other.

16. The method of claim 15, wherein the tree is rooted at a location in the path of a storm, the disposing step is performed before the storm arrives at the location, and the bladder remains disposed on the ground about the tree during the storm.

17. An uprooting-resistant tree assemblage, comprising:

a tree rooted in the ground, the tree having a trunk; and one or more collapsible flexible water-tight bladders disposed on the ground within a radius of seven feet from the trunk of the tree, each bladder having a voluminous body with an exterior surface and interior surface, wherein a first sealed terminal end of the one or more bladders directly abuts a second sealed terminal end of the one or more bladders to form a continuous circumferential boundary at least substantially and closely surrounding the trunk of the tree, wherein each bladder is directly filled with a liquid or friable medium such that the medium contacts the interior surface of a filled bladder, wherein the one or more bladders are collectively filled with at least 300 pounds of a liquid or friable medium, and wherein the one or more bladders and the medium therein collectively weigh at least five hundred pounds.

18. The assemblage of claim 17, wherein the one or more bladders and the medium collectively weigh at least 1,000 pounds.

19. The method of claim 17, wherein each bladder comprises at least one closable opening for filling the bladder with a medium.

20. The assemblage of claim 19, wherein the opening is closed with a cap.

21. The assemblage of claim 17, wherein the one or more bladders comprise a plurality of the bladders disposed on the ground within a radius of seven feet from the trunk of the tree so that the plurality of bladders at least substantially surround the trunk of the tree in a circumferential relationship, wherein circumferentially adjacent bladders are juxtaposed to and contacting each other.

22. The assemblage of claim 21, wherein circumferentially adjacent bladders are secured to each other about the tree.

23. The assemblage of claim 17, consisting essentially of:

a tree rooted in the ground, the tree having a trunk; and one or more collapsible flexible water-tight bladders disposed on the ground within a radius of seven feet from the trunk of the tree, each bladder having a voluminous body with an exterior surface and interior surface, wherein the one or more bladders at least substantially and closely surround the trunk of the tree, wherein each bladder is directly filled with a liquid or friable medium such that the medium contacts the interior surface of a filled bladder, wherein the one or more bladders are collectively filled with at least 300 pounds of a liquid or friable medium, and wherein the one or more bladders and the medium therein collectively weigh at least five hundred pounds.

24. The assemblage of claim 23, wherein the liquid or friable medium consists essentially of water.

25. The assemblage of claim 17, wherein the one or more bladders that at least substantially and closely surround the trunk of the tree are in contact with the trunk of the tree.

26. An uprooting-resistant tree assemblage, comprising:

a tree rooted in the ground, the tree having a trunk; and a collapsible flexible water-tight bladder having a voluminous body with a vertical dimension and a lateral dimension, a vertically oriented central aperture formed therein, and a radial break in the continuity of the bladder body, said break bounded by opposing vertical walls of the bladder body, and said bladder comprising at least one closable opening for filling the bladder with a medium, wherein a liquid or friable medium is disposed within the bladder, the medium weighing at least 300 pounds, wherein the bladder and the medium therein collectively weigh at least five hundred pounds, and wherein the bladder is disposed on the ground within a radius of seven feet from the trunk of the tree with the trunk of the tree vertically extending through the aperture so that the bladder at least substantially surrounds the trunk of the tree.

27. The assemblage of claim 26, wherein the opposing sides of the bladder that bound the radial break are secured to each other.

28. The assemblage of claim 26, wherein the medium disposed in the bladder is a liquid medium.

29. The assemblage of claim 28, wherein the liquid medium consists essentially of water.

* * * * *